United States Patent
Welck et al.

(10) Patent No.: US 7,707,302 B2
(45) Date of Patent: Apr. 27, 2010

(54) METHOD FOR TRANSMITTING A DATA STREAM FROM A PRODUCER TO A PLURALITY OF VIEWERS

(75) Inventors: Johannes Welck, Möhrendorf (DE);
Martin Miller, Fürth (DE); Kurt Kirchhübel, Langenzenn (DE); Ulrich Margull, Regensburg (DE)

(73) Assignee: 1 mal 1 Software GmbH, Furth (DE)

( * ) Notice: Subject to any disclaimer, the term of this patent is extended or adjusted under 35 U.S.C. 154(b) by 603 days.

(21) Appl. No.: 10/490,098

(22) PCT Filed: Sep. 20, 2002

(86) PCT No.: PCT/DE02/03558
§ 371 (c)(1),
(2), (4) Date: Oct. 25, 2004

(87) PCT Pub. No.: WO03/026247

PCT Pub. Date: Mar. 27, 2003

(65) Prior Publication Data
US 2005/0055454 A1 Mar. 10, 2005

(30) Foreign Application Priority Data
Sep. 20, 2001 (DE) ................. 101 46 347

(51) Int. Cl.
*G06F 15/16* (2006.01)
(52) U.S. Cl. .............. 709/231; 709/201; 709/217; 709/219; 370/389; 725/50; 725/51
(58) Field of Classification Search ............ 709/227, 709/201, 217, 219, 231; 370/389, 254; 340/825; 725/50, 51
See application file for complete search history.

(56) References Cited

U.S. PATENT DOCUMENTS
5,884,031 A 3/1999 Ice
(Continued)

FOREIGN PATENT DOCUMENTS
WO WO 00/49743 8/2000
(Continued)

OTHER PUBLICATIONS
Crespo et al "Routing Indices for Peer-to-Peer systems", Feb. 7, 2002, XP-002252824.*
(Continued)

*Primary Examiner*—Thu Ha T Nguyen
(74) *Attorney, Agent, or Firm*—Greenlee, Winner and Sullivan, P.C.

(57) ABSTRACT

In a method for transmitting a data stream, especially a reducible data stream, from a producer to a plurality of viewers, wherein producer and viewers are subscribers in a network having point-to-point connections, the producer transmits the data stream over a point-to-point network connection to at least one viewer, at least one viewer receives the data stream over a point-to-point network connection and promptly transmits it in identical or reduced form to at least one additional viewer, and every viewer is promptly supplied with the data stream in identical or reduced form by either the producer or another viewer over a point-to-point network connection.

17 Claims, 4 Drawing Sheets

U.S. PATENT DOCUMENTS

2002/0188657 A1* 12/2002 Traversat et al. ............ 709/201
2003/0028585 A1*  2/2003 Yeager et al. ............... 709/201
2003/0182428 A1*  9/2003 Li et al. ..................... 709/227

FOREIGN PATENT DOCUMENTS

| WO | WO 01/65767   | 9/2001  |
| WO | WO 01/74076   | 10/2001 |
| WO | 03/026247 A3  | 3/2003  |

OTHER PUBLICATIONS

Egevang, K; Francis, P. "The IP network Address Translator (NAT)", RFC1631, May 1994, 8 pages, Internet RFC/STD,FYI,BCP Archives.

Furht, et al., "IP Stimulcast: A New Technique for Multimedia Broadcasting Over the Internet," Journal of Computing and Information Technology—CIT 6, 1998, 3, 245-254.

Deshpande, et al., "Streaming Live Media Over A Peer-to-Peer Network," 7 pages.

Cohen, et al., "A Unicast-Based Approach for Streaming Multicast," IEEE INFOCOM 2001, pp. 440-448, Department of Computer Science, Technion, Haira 32000, Israel.

VTRAILS HRSG, "VTRAILS Launches Streaming Media Technology at Streaming Media West in California," Press Release, Jun. 20, 2001, 2 pages.

International Preliminary Examination Report (in German), International Application No. PCT/DE2002/003558, Nov. 3, 2003, 5 pages.

International Preliminary Examination Report, English Translation, International Application No. PCT/DE2002/003558, Nov. 3, 2003, 5 pages.

* cited by examiner

200
METHOD FOR TRANSMITTING A DATA STREAM FROM A PRODUCER TO A PLURALITY OF VIEWERS

FIELD OF THE INVENTION

The present invention is directed to transmissions of programs in data networks, with which potentially a plurality of viewers can be reached. In particular, the present invention is directed to a method for transmitting a data stream, especially a reducible data stream, from a producer to a plurality of viewers, wherein producer and viewers are subscribers in a network having point-to-point connections.

BACKGROUND OF THE INVENTION

The Internet, originally designed for static data, is increasingly becoming a platform on which also multimedia data such as audio and video data is transported. Traditionally, data transmission on the Internet takes place in such a way that the available data is present on a server and wait for a user to retrieve them. Here, there is always a certain time span between the production of data and the processing by a user.

Streaming technology pursues another approach, in which the transmitted contents, for example a television program or a radio program, already appear on the user's end during the transmission, so in other words, said user can follow the television or radio program live. Here, it is usually neither required nor desired that the entire program be recorded by the user. This type of transmission is also referred to as real-time transmission, since the data is present on the user's end and is reproduced with no major time lag.

For the purposes of the present application, a program to be transmitted consists of one or more types of different multimedia data, such as motion picture, sound, graphics, texts, applications or any other data. The entire content of a program, in its chronological sequence, forms a data stream that must be transmitted from the producer to the viewers when transmitting a program.

Here, the basic problem arose that providing a data stream to a plurality of viewers in data networks usually involves great effort and high costs.

With the aid of so-called multicast technologies, data can be distributed simultaneously to many subscribers in a network. However, this requires special equipment for the data network, and in particular, the routers must be multicast-capable. Moreover, the configuration and operation of such networks is complicated and arduous.

Thus, many data networks do not have multicast technology, for example multicast is generally not possible on the Internet. In large networks, for which the Internet is one example, multimedia data is thus typically transmitted directly from a particular producer to the individual viewers. For this purpose, the viewer sets up a point-to-point connection to the producer server, for example a TCP/IP (Transmission Control Protocol/Internet Protocol) connection or a UDP/IP- (User Datagram Protocol-) based connection in IP-based networks.

Alternatively, the producer may also install various data servers or employ the services of already installed data servers. In this case, the data is first distributed by the producer to the various data servers. A viewer who wants to receive the data is referred to a data server. A point-to-point connection over which the data is transmitted is set up between data server and viewer.

A drawback of these methods is that, for both alternatives, the producer must provide an adequate network connection. All data is transmitted over point-to-point connections, at one end of which is a data server of the producer and on the other end of which is the viewer. A separate connection must be set up for every viewer, so that, for n viewers, n-fold transmission capacity must be available. Moreover, the n-fold quantity of data to be transmitted accumulates for the producer, since the data has to be transmitted to each viewer separately. If the producer wants to reach many viewers, he is forced to make large bandwidths available. If his program is successful, large quantities of transmitted data accumulate. In both cases, the producer must expect high costs.

A further disadvantage is that the available software is difficult to operate due to the complex technology and requires special training for the operating staff.

DESCRIPTION OF THE INVENTION

This is the starting point for the present invention. The object of the present invention, as characterized in the claims, is to provide a transmission method of the above mentioned type that avoids the cited disadvantages of the background art, and especially that enables the transmission of a data stream to a plurality of viewers even for producers with low transmission bandwidth.

This object is solved by the transmission method according to claim 1. Preferred embodiments of the method are the subject of the dependent claims.

The present invention provides a method for transmitting a data stream, especially a reducible data stream, from a producer to a plurality of viewers, wherein producer and viewers are subscribers in a network having point-to-point connections, wherein, in the method, the producer transmits the data stream to at least one viewer over a point-to-point network connection, at least one viewer receives the data stream over a point-to-point network connection and promptly transmits it in identical or reduced form to at least one additional viewer, and every viewer is promptly supplied with the data stream in identical or reduced form by either the producer or another viewer over a point-to-point network connection.

The present invention is thus based on the idea of realizing data distribution at the network level without the use of broadcast services in that the producer himself supplies only a few viewers with the data stream, and in that additional viewers are not supplied by the producer directly, but by other viewers who themselves are already being supplied with the data stream and who have sufficient transmission bandwidth available.

This allows also subscribers with low bandwidth (for example a 64 kBit/s standard network connection) and standard PC equipment to produce programs that can promptly be viewed by a plurality of other subscribers, for example several thousand viewers.

Here, promptly means that, except for a technology-induced temporal offset due to the forwarding of the data stream, a produced program can be received by all viewers simultaneously.

The transmission can additionally be improved if reducible data, especially motion picture and sound data, is adjusted to the respectively available bandwidth of the individual subscribers by data reduction.

Transmitting the data stream from the producer to one or more viewers, and then from one or more of the viewers to additional viewers, gives rise to a tree structure for the overall transmission, which is referred to below as a transmission tree. Here, the producer forms the roots of the tree and the viewers the nodes of the tree. Every node here either transmits the data stream further to one or more other nodes, or it represents a so-called leaf of the tree, which merely receives the data stream, but does not transmit it further.

The connections between the nodes correspond to the point-to-point network connections between individual subscribers.

In a preferred embodiment of the method, when a viewer who supplies an additional viewer with the data stream becomes unavailable, another transmission subscriber takes the place of the unavailable viewer to supply the additional viewer, in that a point-to-point network connection is set up between the additional viewer and the other subscriber, over which said subscriber promptly transmits the data stream in identical or reduced form to the additional viewer.

Here, a relaying entity may, following an appropriate notification, relay to the additional viewer the other subscriber, who is capable of promptly transmitting the data stream in identical or reduced form to the additional viewer.

Likewise, it is possible, alternatively or additionally, that to each viewer who becomes a transmission subscriber is relayed a transmission subscriber who promptly supplies the viewer with the data stream, and furthermore, at least one additional transmission subscriber is made known who presumably is capable of promptly transmitting the data stream to the viewer if the supplying subscriber becomes unavailable.

If the supplying subscriber becomes unavailable, the viewer can then first directly approach the additional named subscriber with a transmission request. If said subscriber is capable of supplying the viewer with the data stream, an elaborate detour via the relaying entity is not necessary and the viewer can be supplied with the data stream with no appreciable delay. If the named subscriber cannot assume the supply, he names an additional potential supplier to the requesting viewer, or refers him to the relaying entity.

The cited measures render the transmission method self-curing, that is, the unavailability of a viewer who transmits the data stream further is absorbed by the system and the unavailable viewer is replaced in his function as a transmitter by another subscriber. This occurs, to the greatest extent possible, without interruption of the transmission and with no explicit actions by the supplied viewers.

In this transmission method, it is advantageous when a new viewer becomes a transmission subscriber in that the new viewer sends a subscription request to a relaying entity over a point-to-point network connection, the relaying entity relays to the new viewer a transmission subscriber who is capable of promptly transmitting the data stream to the new viewer, and a point-to-point network connection is set up between the new viewer and the relayed subscriber, over which said subscriber promptly transmits the data stream in identical or reduced form to the new viewer.

Here, the relaying entity can relay to the new viewer a transmission subscriber who is capable of promptly transmitting the data stream to the new viewer, in that a) the relaying center names at least one transmission subscriber to the new viewer over the point-to-point network connection, b) it is checked whether one of the named subscribers is capable of promptly transmitting the data stream to the new viewer, c) in the event that none of the named subscribers themselves are capable of promptly transmitting the data stream to the new viewer, one of the named subscribers names to the new viewer at least one additional transmission subscriber, and d) steps b) and c) are repeated until a transmission subscriber is found who is capable of promptly transmitting the data stream to the new viewer.

The point-to-point network connection between the new viewer and the relayed subscriber can now be set up in that the new viewer, following relaying of a subscriber who is capable of promptly transmitting the data stream to him, sends a connection request to said relayed subscriber, whereupon a point-to-point network connection is set up between the subscribers.

Likewise, the relaying entity can send, via an existing point-to-point network connection, a request to the relayed subscriber to establish a point-to-point network connection with the new viewer. Subsequently, the relayed subscriber can send a connection request to the new viewer. This procedure is especially advantageous when the network identifier of the relayed subscriber is hidden by an access computer. Such subscribers are referred to below as NAT (Network Address Translation) subscribers. Then it is not possible for the new viewer to start a connection with the NAT subscriber. However, the relaying entity can induce the NAT subscriber over the existing connection to initiate a connection to the new viewer on his part.

In particular, a NAT subscriber will expediently be relayed only to those new viewers whose network identifier is not hidden (non-NAT subscribers).

It has turned out to be advantageous that a NAT subscriber is relayed to a non-NAT subscriber only if at least one additional non-NAT subscriber is relayed to the non-NAT subscriber. Then, namely, if the non-NAT subscriber becomes unavailable, the additional non-NAT subscriber can assume his role.

Access to a transmission can be restricted to certain subscribers. In this case, a new viewer will be admitted as a transmission subscriber only if the relevant program is open to him. He can obtain access for example by entering a password or an access code, through a prior registration or by registering from a computer with a specific network identifier.

In a further preferred embodiment of the method, the producer registers the transmission of the data stream with a relaying entity prior to start, and the relaying entity announces the transmission to potential viewers so that said viewers can send a subscription request to the relaying entity over a point-to-point network connection.

Advantageously, every transmission subscriber carries out a short-term buffering of the received data stream. The viewer then sees/hears, not the data just received, but rather the data received a short time before, taken from the buffer. In this way, brief interruptions of the incoming data stream can be compensated for through the software, unnoticed by the viewer.

In particular, it is expedient when, if a viewer who supplied an additional viewer with the data stream with a time offset $\Delta t$ becomes unavailable, the additional subscriber, who subsequently assumes the supply to the additional viewer, supplies the additional viewer with the data stream with the same time offset $\Delta t$, possibly relying on his buffered data. The change of the supplying viewer can then occur unnoticed by the additional viewer.

To do this, it is necessary that the short-term buffering covers a time span that corresponds to the maximum time delay in the transmission tree. The precise maximum time delay depends, of course, on the size of the tree and the transmission path lengths. The typical maximum time delays of up to several seconds can, however, easily be buffered.

It has proven to be expedient when the subscribers transmit to the relaying entity, over the existing point-to-point connections with said relaying entity, connection data containing details about the arrangement of the subscribers in the transmission tree and/or current transmission rates.

The relaying entity can, on the basis of the transmitted connection data, improve the structure of the transmission tree for the optimum possible reception quality for the subscribers, and send appropriate connection start, connection interrupt or connection modification requests to the subscribers.

In a preferred embodiment of the transmission method, the viewers can transmit feedback to the producer or the relaying entity over the point-to-point connections.

Further advantageous embodiments, features and details of the present invention are evident from the dependent claims, the description of the exemplary embodiments and the drawings.

BRIEF DESCRIPTION OF THE DRAWINGS

The present invention will be explained in further detail below by reference to exemplary embodiments in conjunction with the drawings. Only the elements that are essential to understanding the present invention are illustrated. In the drawings

MANNER OF CARRYING OUT THE INVENTION

The method according to the present invention enables one of the subscribers, the producer of a program, to announce the occurrence of the transmission and, if appropriate, additional information about the content and type of the program to other subscribers, the viewers, and to distribute the data stream representing the program over the data network to the viewers.

Here, a program consists of various multimedia data, such as motion picture, sound, graphics, texts, applications, etc., or any other data. A program may, for example, be designed like a television program, in other words consist of motion picture and sound, or may include educational components such as explanations and may thus have the form of teleteaching, computer-based training (CBT) or web-based training (WBT). The various elements may be arranged on the screen in any desired way, and in particular, images or other motion picture data may be displayed in a motion picture window.

Figure 1:
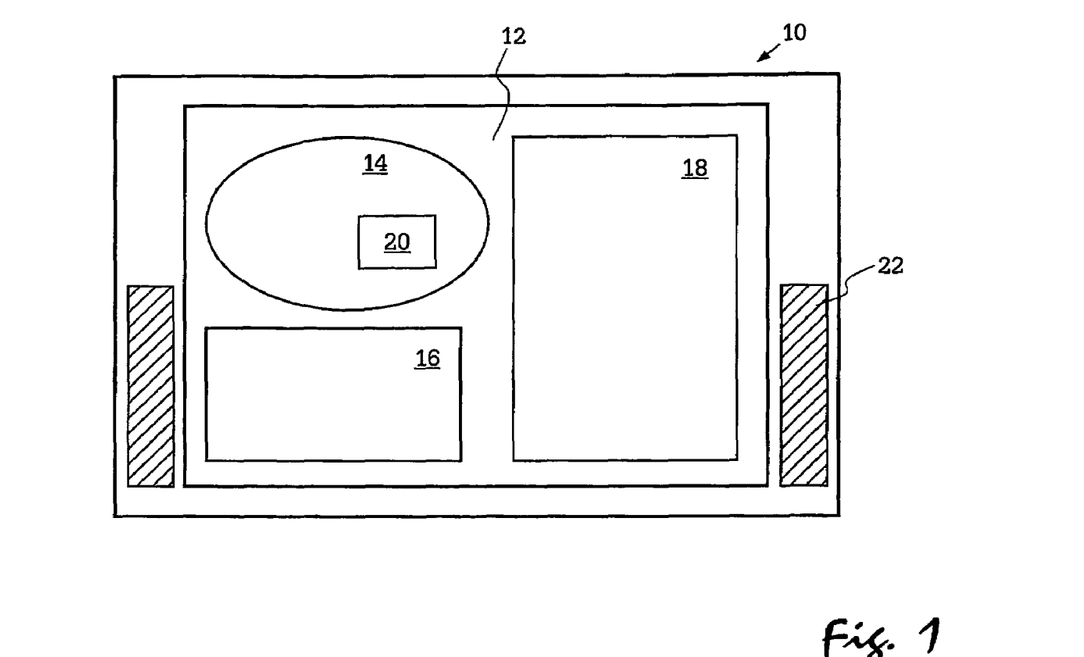
FIG. 1 shows a schematic diagram of a complex transmission format with two motion pictures, sound, one graphics and one text/graphics window.

FIG. 1 shows an exemplary illustration of a complex transmission format in which a motion picture window 14, a graphics window 16 and a window 18 for text and graphics are arranged on the image area 12 of a computer monitor 10. Within the motion picture window 14 is arranged an additional motion picture window 20 for picture-within-a-picture display. The corresponding sound data is delivered over loudspeakers 22.

For example, the corresponding program transmission could have a talk as content, in which the text of the talk is rendered over the loudspeakers 22, a real-time image of the speaker is visible in the motion picture window 14, presentation charts appear in the text/graphics window 18, and drawings produced by the speaker for explanation are displayed in the graphics window 16. If the speaker additionally shows a video recording, or if he runs a program on a computer, the video image or the output of the program may appear in the picture-within-a-picture window 20.

As the oval motion picture window 14 illustrates, the exterior shape of the individual window is not necessarily rectangular. Here, unusual shapes lend themselves especially to less formal broadcasts.

Various content types can also be displayed successively in one image window. Thus, e.g., the real-time image of the speaker in the motion picture window 14 can be preceded by information about the program in a text that is shown before the motion picture transmission.

In addition to the aforementioned data formats, other data of any kind can be transmitted within a program, such as program data, user data or application data.

Interactive elements can also be realized within a program. In text-based discussion fora, such as so-called chat rooms represent, the viewers of a program and the producer can exchange texts. Further elements are menu items or polls that are offered to the viewers (for example by multiple choice), or viewer queries to the producer, which can be realized, especially in text-based form or with sound transmission.

The design of a program is defined in program formats. A program format is, for example, the television format, in which only sound and motion picture is transmitted. Another format is the radio format, which consists of sound only. A format for training could consist, for example, of motion picture, sound and supplementary graphics and texts, as depicted above in connection with FIG. 1.

A program may be public, that is, any interested party can participate in the transmission as a viewer. For closed transmissions, on the other hand, the producer or another entity can define which subscribers may participate in the program transmission and which may not.

The transmission data is promptly transmitted by the producer to the viewers via a tree structure. Here, promptly means that, except for a technology-induced temporal offset, the transmission can be received simultaneously by all viewers. The technology-induced temporal offset depends on the depth of the transmission tree, and adds up to, for example, 10 seconds.

The central contact point for producer and viewers is the relaying center. To carry out a program transmission, the producer registers with the relaying center the program and the relevant data, such as time and duration of the transmission, title and content, content classification by category, and the like. This information, together with the name and additional data of the producer, may be published, for instance, in an electronic program guide. They serve the potential viewers as orientation when selecting the programs offered.

Following registration of the program, the relaying center generates an identifier and various access codes for this program. The identifier serves to uniquely identify the program. An access code serves the subscribers for example as authorization to view the program. For public programs, the access codes may be published in an electronic program guide so that everyone can view the program.

The relaying center may be formed by one or more computers set up in one location, or also by computers that are spread over various locations and together assume the tasks of the relaying center. In particular, it is also possible that the producer himself assumes the function of the relaying center.

From the relaying center, the producer may download, in the form of software modules, or procure on a data carrier, the additional software needed to produce the program and then install it locally on his computer.

For this purpose, various technologies from the Internet environment can be used, such as plugins or ActiveX controls. These are software modules that are loaded from a web server as needed. If a page that contains a software module is called up in the Internet browser, the Internet browser downloads, via a link contained in said page, the necessary software module from the server, installs said module on the viewer's computer and subsequently executes the software. If the software module is already installed in the current version, it is no longer downloaded, but rather the already installed module is immediately executed.

Here, the plugin technology was originally developed by Netscape, while the ActiveX technology stems from Microsoft. Popular browsers such as Internet Explorer from Microsoft support both types, that is, both plugins and ActiveX controls. However, any other technologies for loadable software modules can be used, such as Java applets or JavaScript libraries.

Even if the use of the cited web-based software module distribution mechanisms greatly simplifies the obtainment of the required software for the users, all other mechanisms for distributing the software module may also be considered, such as sending the required software on permanent data carriers such as CDs or diskettes, sending by e-mail, separate download via ftp, and the like.

To prepare the program transmission, the producer performs all necessary software settings, such as the camera selection and setting, microphone selection and setting, preparing graphics and contributions, and defining closed user groups. These settings are saved and are used in the context of the program transmission.

The producer can now start producing the program. Following its registration, the program transmission is activated by the relaying center shortly before its start. All interested subscribers are now informed that the program transmission was activated and that they can receive the transmission from now on.

Before the actual start of the program transmission, a leader may be sent, for example a test image or an advertisement.

The producer starts the program transmission, and the data representing the program is transmitted in the form of a data stream, directly or indirectly, by the producer to the viewers until the producer terminates the program transmission.

The producer of a program may record same during the transmission. For a later program transmission, he may then, in place of a new transmission, transmit the recorded program. The transmission method proceeds analogously to the transmission of a live program.

A program may feature options for interaction. These may be polls in which the producer offers the viewers various options for selection. The viewers may select an option through various actions, such as clicking a button on the screen or entering a text. The producer then receives feedback about the actions taken, for example information about how many viewers chose a specific option, or which viewers chose which options.

Another possibility offer chat rooms, in which the viewers can hold discussions among themselves and with the producer via the computer keyboard. In addition to open chats, moderated chats may also be used, in which the producer can influence the statements of individual viewers, for example in that he removes specific text portions.

All interaction options can be carried out only by the viewers of the program, that is, by the subscribers relayed to the program transmission over the relaying center.

A program may be rated by any subscriber who subscribed to the program. For this purpose, the subscriber is offered a ready-made rating scale on which he enters the desired rating. In particular, classifications according to various standards are possible, such as the legitimacy and the moral innocuousness of the content. Further, discretionary remarks may be submitted about the content or the quality of the broadcasts. These ratings may be linked in the electronic program guide with the producer or the name of a program series, so that the viewers can use earlier ratings of similar programs or earlier ratings of other program by the same producer for orientation when selecting a program.

A subscriber to the program transmission (producer or viewer) requires a standard PC (Personal Computer) equipment, for example (status as of mid-2001) a PC with a 300 MHz Pentium III processor, and a standard network connection to the data network used, such as a 64 kBit/s connection to the Internet. To produce sound and motion picture data streams, the appropriate equipment is required, that is, a standard microphone and a standard PC camera, for instance a webcam with a USB connector, or a digital video camera which can be connected to a PC.

A subscriber may register with the central relaying center with his name, his e-mail address and other personal data.

A key trait of the method according to the present invention is the fact that every subscriber who is connected to the data network used, and who has the minimum equipment, can easily act both as a producer and as a viewer of a program.

The relaying center is the central contact point both for the producer and for the viewers. The relaying center is typically web based, that is, it has an interface that can be used by the producer and viewers with the aid of a standard Internet browser. Relevant standards include especially HTML as the page description language, http as the transmission protocol and TCP/IP as the network technology. In addition, software modules are used for the multimedia display, which, like the software modules of the production technology, can be loaded as plugins, ActiveX, or in any other manner.

Viewers who want to subscribe to a program transmission receive from the relaying center, following the transmission of their subscription request, all of the information and software modules required therefor. For this purpose, first, various properties of the subscriber computer are identified, such as its processing power, the quality and capacity of the network connection, and the like. Subsequently, this data is transmitted to the relaying center.

Based on this data, the relaying center works out a suitable position for the subscriber in the tree structure of the program transmission, as described in detail below.

All relevant information for participation, such as the program identifier, the position and excerpts of the tree structure, is transmitted from the relaying center to the subscriber. With this information, the subscriber sets up a point-to-point network connection to the producer or another subscriber to the program transmission. Over this connection, the subscriber is then supplied as a new viewer with the program data stream.

The data is prepared appropriately by the relaying center, for example signed, so that the software installed on the subscriber computers can verify the authenticity of the relaying center. Additional measures are also taken that preclude participation without the use of the relaying center, such as a time stamp to prevent a so-called replay attack, in which old connection data is intercepted and used multiple times.

The relaying center continuously receives from the subscribers information about the current network structure and its properties, for example the quality of the various connections between the subscribers. This information gives the relaying center a view of the present tree structure of the program transmission and enables it to recognize and carry out improvements. For this purpose, the relaying center can address individual subscribers to the program and thus induce changes to the tree structure.

The relaying center can remove individual subscribers from the program transmission or interrupt or terminate the entire transmission. For every program, the relaying center can draw up a statement of relevant information, such as the number and duration of the subscribers, an explicit listing of all subscribers, and the like. This information can be made available to the producer or other interested parties.

A viewer can subscribe to a program registered by the producer with reference to a program identifier that he selects, for example, from the program guide, or that is otherwise communicated to him, for instance by the producer himself or by the relaying center, for example by e-mail. After the program transmission has been activated, the viewer can have the relaying center relay him into the transmission. To do this, he activates the appropriate access identifier, for instance by clicking a hyperlink, and the required software is launched. Upon its first usage, or if changes are made to the software or the configuration, the software is first installed and then launched according to the method for the software module used, in other words, for instance, the plugin or ActiveX method.

The producer may define whether a program may be received by every subscriber or by only a specific, closed user group. For this purpose, the producer may first set up a user group at the relaying center. The subscribers must then be registered with the relaying center and possess a unique identifier. The producer or another authorized center can include an individual user in a closed user group by means of this identifier.

In the context of the announcement of a program, the producer can define the user groups for which the program transmission is to be made accessible. If the program transmission is accessible only to one or more closed user groups, only permitted subscribers will be relayed to a program. If the identity of the subscriber cannot be determined or if the subscriber does not possess the required authorization, the connection request will be denied by the relaying center.

Figure 2:
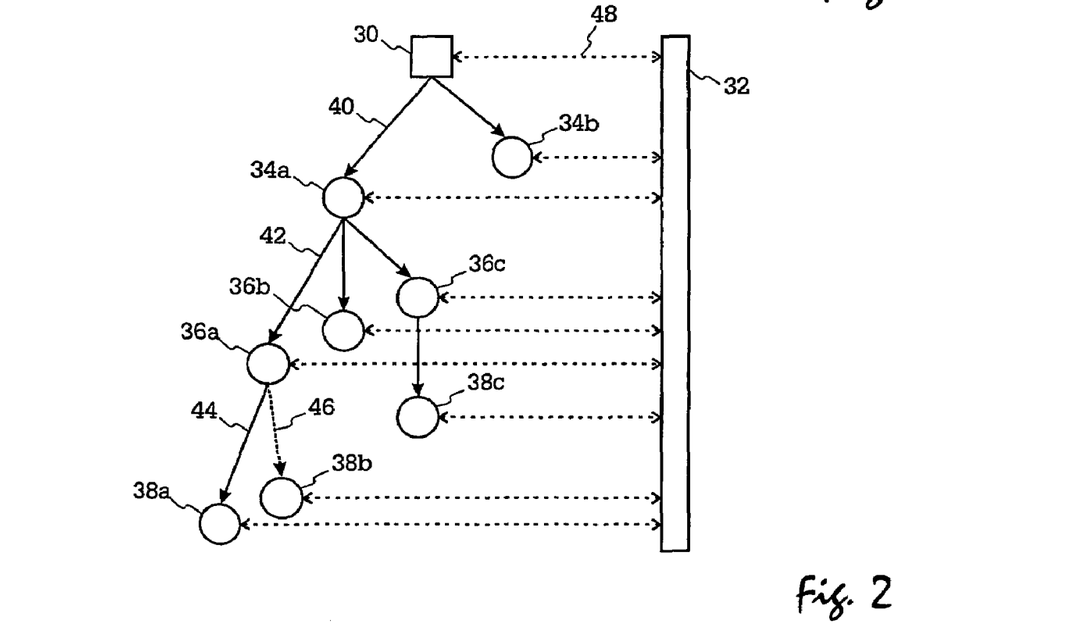
FIG. 2 shows a schematic diagram of a transmission tree set up with an embodiment of the method according to the present invention.

FIG. 2 illustrates the tree structure of a program transmission with the relaying center with eight viewers. The producer 30 has transmission capacity for two viewers 34a, 34b, to which he transmits the data stream over point-to-point network connections 40. The viewer 34a himself supplies three additional viewers 36a-c with the data stream.

Here, due to the reception and the forwarding of the data stream by the viewer 34a, a small time delay of some 10 to 100 milliseconds accrues, so that viewers 36a-c receive the transmission with a time delay compared with viewers 34a-b. A similar time delay accrues from every subsequent forwarding, so that viewers who are arranged many nodes downward of the producer in the tree structure receive the transmission with a greater time delay of up to several seconds. This time delay must be taken into account for interactions or rearrangements of the tree structure.

The viewer 36a, in turn, supplies two additional viewers 38a,b with the program data stream over network connections 44, 46. Viewer 38b, due to his technical equipment (for instance a slower modem) has only limited reception bandwidth and is thus supplied with a reduced version 46 of the data stream.

Since this limited reception bandwidth was made known when the viewer 38a made contact with the viewer 36a, the viewer 36a can make allowance for it in that, for example, the number of frames of a motion picture transmission is reduced for the viewer 38a.

Also after their successful relay to the program transmission, the relaying center 32 and the subscribers exchange connection data 48 that relates for instance to the quality of the various subscriber connections and the tree structure, so that the relaying center 32 can optimize or otherwise modify the tree structure as needed.

Figure 3:
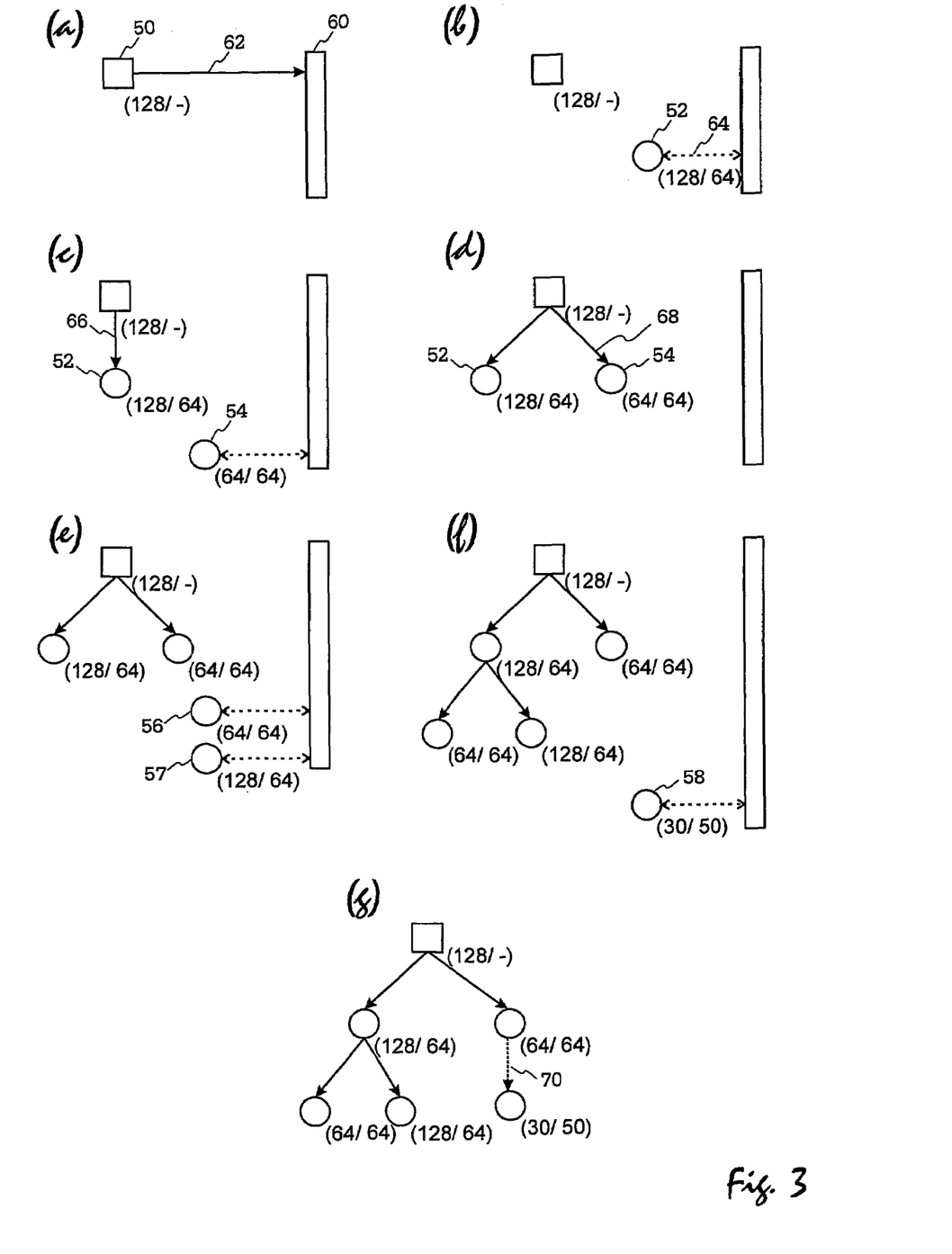
FIG. 3 shows, in a) to g), the steps occurring in setting up a simple transmission tree.

The setup of a transmission tree is exemplified in FIG. 3. The producer 50 of a program first registers the program with the relaying center 60 by communicating over the data network to the relaying center 60 information 62 about the start, duration, type and content of the program (FIG. 3a). In the exemplary embodiment, the producer 50 also communicates that he has a network connection with a transmission bandwidth of 128 kBit/s. At the same time, it is assumed that the program can be transmitted in full quality with a bandwidth of 64 kBit/s. The producer 50 can thus supply two recipients with the data stream with his transmission bandwidth.

Following announcement of the program by the relaying center in an electronic program guide, a first viewer 52 with a transmission bandwidth of 128 kBit/s and a reception bandwidth of 64 kBit/s reports to the relaying center 60 with a subscription request (FIG. 3b). Transmission and reception bandwidth of the viewer 52 is indicated in FIG. 3 in abbreviated form as (128/64).

In reply, the relaying center 60 communicates to the viewer 52 over the network connection 64 the necessary connection data, especially the network identifier of the producer 50.

In the data network, between the viewer 52 and the producer 50, a point-to-point network connection 66 is now set up, over which the producer 50 supplies the viewer 52 with the transmission data stream (FIG. 3c).

A second viewer 54 with a transmission and reception bandwidth of 64 kBit/s (abbreviated (64/64)) is likewise relayed by the relaying center 60 to the producer 50 (FIG. 3d). Also between the viewer 54 and the producer 50, a point-to-point network connection 68 is set up, over which the second viewer 54 is supplied with the transmission data stream.

The transmission capability of the producer 50 is now working at full capacity supplying the two viewers 52, 54. The next viewers 56, 57 that direct a subscription request to the relaying center 60 (FIG. 3e) thus can no longer be relayed to the producer 50. In the exemplary embodiment, both viewers are relayed to the viewer 52, who, with 128 kBit/s, has sufficient transmission bandwidth for two recipients (FIG. 3f).

The relaying of the viewer 56, 57 to the viewer 52 can occur in that the relaying center has information about the transmission/reception bandwidths of all subscribers and relays new viewers according to the free capacities remaining. Alternatively, the relaying center may also name to a new subscriber merely the identifier of one or more program subscribers. The new subscriber then directs a transmission request to one of the named subscribers. If this subscriber is capable of transmitting the data stream to the new subscriber, he assumes this role. Otherwise, he declines and names to the new subscriber additional transmission subscribers known to him, to whom said new subscriber can direct his transmission request.

Following successful relaying, the new subscriber receives not only information about his father in the transmission tree, that is, the subscriber who supplies him with the data stream, but also about his grandfather, that is, the subscriber who supplies his father with the data stream. In general, every subscriber receives information about his local environment in the transmission tree. In this way, when a subscriber becomes unavailable, limited rearrangements of the tree can be made by the affected subscribers in the local environment without a detour via the relaying center, and thus more quickly. Following a rearrangement, the relaying center is notified of the changes made so that said relaying center can track and further modify the current tree structure as needed.

The next viewer 58 with a limited transmission (30 kBit/s) and reception bandwidth (50 kBit/s) is relayed via the relaying center 60 to the viewer 54. The software installed on the PC of the viewer 54 reduces the transmission data stream to the transmission rate of 50 kBit/s (reference sign 70) prior to forwarding, since the viewer 58 cannot process a higher rate (FIG. 3g). To achieve optimum reception quality for the viewers, whenever possible, no viewer with a higher reception bandwidth will be relayed to a viewer with a reduced transmission bandwidth.

Figure 4:
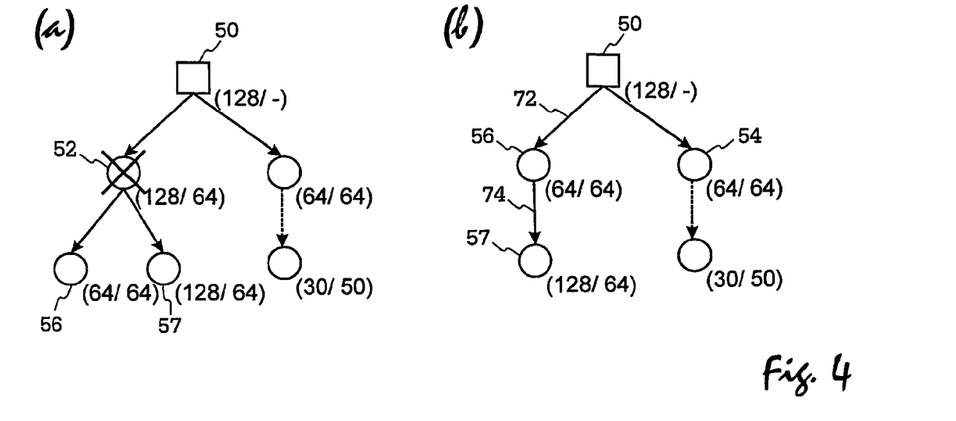
FIG. 4 shows, in a) and b), the rearrangement occurring in the transmission tree in FIG. 3g) when a viewer becomes unavailable.

FIG. 4 illustrates the actions after a subscriber in the transmission tree becomes unavailable or withdraws. The viewer 52 terminates in FIG. 4a his subscription to the transmission. This can occur both in controlled form, in that the viewer logs off from the program transmission, or abruptly, for instance by turning off the subscriber computer or an interruption of the network connection. In both cases, for a disruption-free transmission of the program transmission to the other subscribers, it is important that the new arrangement of the transmission tree occur as quickly as possible and unnoticed by the remaining subscribers.

To absorb unavoidable delays when newly arranging, for every subscriber, the data received is buffered by the installed software for a certain time span before it is displayed. In this way, a delay during the new arrangement can remain unnoticed by the subscribers by playing back already saved data, as long as the delay remains within the buffered time span.

Moreover, the time offset can be chosen for each individual subscriber such that the program is displayed simultaneously for all subscribers. Here, of course, in relation to the producer, it is displayed with a certain, but for all viewers identical, time offset. Since there is no time offset between the viewers, this variant allows particularly simple new arrangements or rearrangements of the transmission tree.

If, as described above, the viewers 56, 57 know, in addition to their father 52, also their grandfather in the transmission tree, here the producer 50, they can compensate for the unavailability of their father 52 also without a detour via the relaying center 60. Both viewers 56, 57 direct a transmission request to their grandfather 50. Due to the unavailability of the viewer 52, said grandfather has transmission capacity available for one additional viewer. The rearrangement can then occur, for instance, in that between viewer 56 and producer 50 a connection 72, and between viewer 57 and viewer 56 a connection 74 is set up, over which the data stream is transmitted by the producer 50 via the viewer 56 to the viewer 57 (FIG. 4b).

Here, it is also taken into account that the viewer 56 now moves further up in the transmission tree. If, for example, he previously received the data stream from the viewer 52 with a time offset of 500 ms, he would now receive it from the producer 50 directly, that is, with no time offset. This is taken into account in the connection setup between the producer 50 and the viewer 56 in that the producer 50 supplies, from his buffer, the viewer 56 with data that is offset precisely 500 ms from the current data stream. Thus, the program continues without disruption for the viewer 56, despite rearrangement.

Furthermore, it is possible that, in an existing program transmission and an existing transmission tree, the producer changes, or is supplemented by an additional producer who assumes a portion of the program transmission.

Figure 5:
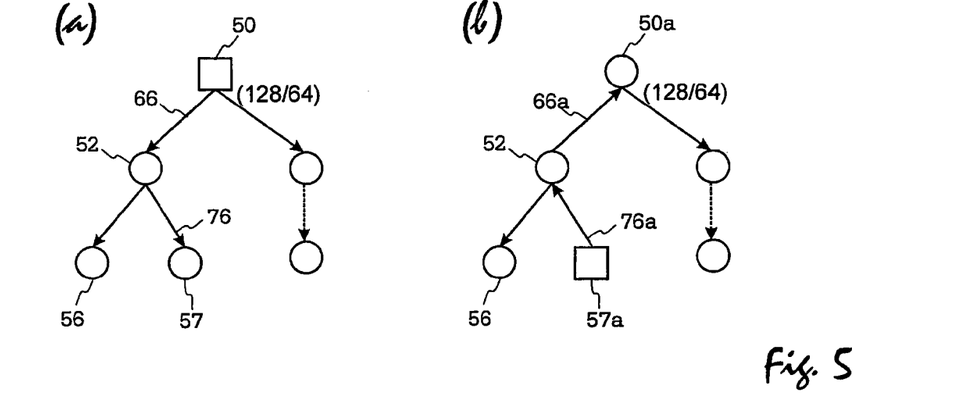
FIG. 5 shows, in a) and b), the new arrangement of the transmission occurring in the transmission tree in FIG. 3g) when the producer is replaced.

A simple case of a producer change is depicted in FIG. 5. The initial situation in FIG. 5a corresponds to the situation depicted in FIG. 3 at the end. If the producer 50 would now like to hand the program over, potential new producers report to the producer 50, following an appropriate notice. In the exemplary embodiment described, said producer has a reception capacity of 64 kBit/s, and the transmission and reception capacities of the remaining subscribers are as shown in FIG. 3g. The producer 50 now selects one of the subscribers as his successor, in the exemplary embodiment the subscriber 57.

With reference to FIG. 5b, the subscriber 57 now becomes the new producer 57a. The transmission direction for the point-to-point connections 76a and 66a is now reversed compared to the previous situation, toward the earlier producer and current viewer 50a. The connections leading from the viewer 50a in the right portion of the transmission tree need not be changed. However, due to the modified positions in the tree, the time offset of individual subscribers to the new producer 57a will usually differ from the time offset to the earlier producer 50. This can be taken into account when reversing the transmission directions, which likewise represent a rearrangement of the tree, analogously to the situation described in connection with FIG. 4.

Figure 6:
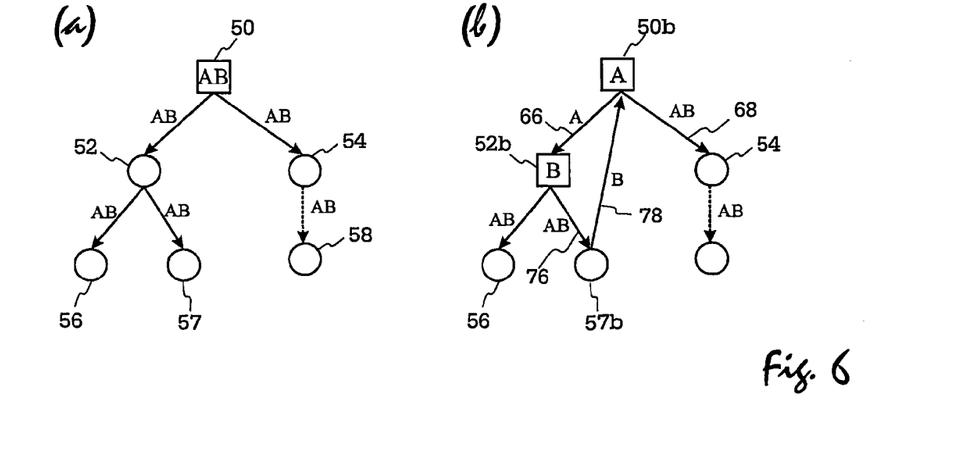
FIG. 6 shows, in a) and b), the new arrangement of the transmission occurring in the transmission tree in FIG. 3g) when a program is split between two producers.

FIG. 6 exemplifies the case that a producer 50 hands only a portion of the transmission over to another subscriber. In the initial situation in FIG. 6a, which corresponds to the situation at the end in FIG. 3, the producer produces a transmission consisting of two portions, A and B. Here, the portions A and B may, for example, stand for image and sound of a program. First, in the situation in FIG. 6a, the producer 50 transmits both portions AB together to the viewers 52, 54, which transmit them to additional viewers 56, 57, 58.

Now, one of the subscribers can take over a portion of the transmission. In the exemplary embodiment, the viewer 52 takes over the production and transmission of the sound B and thus becomes, himself, the coproducer 52b. The producer 50b now produces and transmits only the image portion A of the data stream.

In the event that the coproducer 52b has sufficient transmission bandwidth, he can transmit his portion B of the transmission to the producer 50b. Said producer 50b combines the portions and transmits both portions AB in the manner described above.

If, however, as in the exemplary embodiment in FIG. 6, the coproducer 52b has no free transmission capacity, the following procedure may be used: He transmits his portion B together with the portion A received from the producer 50*b* further along the transmission tree to a subscriber 57*b* with sufficient free transmission capacity. A new point-to-point connection 78 is set up between the subscriber 57*b* and the producer 50*b*, over which the subscriber 57*b* supplies the producer with the transmission portion B. The producer 50*b* himself transmits to the subscriber 52*b* only the transmission portion A, but to the other subscriber 54, the entire program AB. Overall, in this way, every subscriber is supplied with both portions of the program transmission. Of course, the occurring time offset must usually be taken into account when combining the partial program transmission A, B in the event that an exact synchronization of both portions is necessary due to the type of program, for instance for image and sound that belong together.

The rearrangements described for FIGS. 5 and 6 can be carried out without making contact with the relaying center. It is, however, expedient if said relaying center is at least subsequently informed of the changes.

Transmission Method and Relaying Technology

All data is transmitted over the network by the producer to many viewers. In non-multicast-capable networks, such as the Internet represents, the data can be transmitted with conventional technology to many viewers only with great technical effort. Typically, however, point-to-point connections between individual subscribers in the network are easily possible, and are realized in IP-based networks for instance through TCP/IP or through UDP/IP. In the method described here, these point-to-point connections are used for example as follows:

The data is transmitted by the producer directly to one or as many viewers as the producer is capable of supplying. If more viewers are interested in a program than can be supplied by the producer directly due to his limited bandwidth, said viewers are not supplied by the producer directly, but by other viewers who are already being supplied with the data and still have sufficient bandwidth available in upload direction. In particular, this method is also applicable when the producer himself is capable of supplying only a single viewer.

For the transmission, a tree structure emerges in which the producer represents the root of the tree and the viewers the nodes of the tree. The connections between the nodes correspond to the point-to-point network connections between individual subscribers.

Not only the user data is exchanged over the connections, but also connection data. In this way, the individual nodes know portions of the entire tree. Nodes with free upload capacity transmit this information in open intervals to the relaying center, which thus knows of the individual nodes of the tree and their connections. Moreover, information relating to the quality of the individual connections is also transmitted. Based on this information, the relaying center can suitably arrange new subscribers in the tree. Further, the relaying center or individual nodes can effect a change in the tree in order to improve individual connections and thus optimize the overall transmission rates in the tree.

In addition to the user data, connection data is also transmitted over the existing connections. This connection data contains information required to maintain and optimize the tree structure, such as information about the arrangement of the subscribers in the tree, current transmission rates, and the like.

The connection data is transmitted bidirectionally. To a small extent, interactive data can also be transmitted in this way. For example, the voting results of a poll can be transmitted thus from all viewers to the producer.

Alternatively, interactive data that requires a larger bandwidth, such as sound data, can be transmitted directly from the individual subscriber to the producer.

An additional option consists in that the entire data stream or portions thereof are generated by a new producer. Thus, e.g., a subscriber can briefly become the producer for the sound in that, for example, he interposes a question. If this subscriber no longer has sufficient transmission capacity, a portion of the original data stream is replaced by the new data stream, e.g. the original sound is replaced by the new sound. From there, the modified data stream is forwarded until a subscriber with sufficient transmission capacity is found who forwards the new data stream to the original producer.

The data is promptly distributed to all subscribers via the tree structure. Here, if the transmission capacity between two subscribers is not sufficient to transmit all data, the following procedure is used:

Multimedia data streams consist of various partial data streams, such as a motion picture data stream, a sound data stream and a graphics data stream. Some of these data streams can be reduced, if not always losslessly (compression), but rather lossily (reduction). This means that the multimedia data is modified such that they can also be transmitted with lower bandwidth for substantially identical content.

Typically, this is possible only by accepting a poorer quality (for example fewer frames per second for motion picture, greater noise or lower dynamic scope for sound data). Thus, for example, a motion picture data stream can be reduced by transmitting fewer frames than originally recorded by the producer.

In the method of the exemplary embodiment described, a lossy reduction of the multimedia data stream or of portions thereof is now performed as needed for the individual nodes in such a way that the available transmission capacity is sufficient for a data transmission, if with quality losses.

Through the suitable set up or a suitable restructuring of the tree structure, it can be achieved that, despite individual quality losses due to limited transmission capacities, the optimum possible quality is achieved for every subscriber.

The subscribers are arranged in the tree structure such that as many subscribers as possible can be supplied with the highest possible transmission quality. This can be achieved in that every subscriber with high available transmission bandwidth supplies multiple viewers with data. Here, an arrangement criterion is the maximum bandwidths and the quality of the network connection of the individual subscribers. In IP-based networks, the IP number can be consulted in order to recognize optimum connections between the subscribers.

Another arrangement criterion is the number of intermediate stations (hops) the data takes on the path through a network: In data networks, some of the paths that the data takes between two points can be identified. This can be carried out e.g. with a traceroute method that identifies the IP network nodal points (routers) that lie on the data path. With this information, e.g. the total number of hops needed for all subscribers in the tree structure can be improved, that is, reduced.

Overall, an optimum or at least a well-suited transmission tree is thus constructed out of all possible connections.

NAT Subscribers and Non-NAT Subscribers

In large TCP/IP-based networks, such as the Internet represents, many subscribers have no direct access to the data network, but rather the access is realized via access computers, so-called NAT routers, which hide the subscriber's IP number from the outside. No TCP/IP or UDP/IP connection can be set up to such a subscriber from outside. However, they themselves can set up connections to other subscribers without NAT.

To allow NAT users to subscribe to the transmission method described above, the following procedure can be applied: Every subscriber (producer or viewer) first makes contact with the relaying center according to the Internet standards (TCP/IP, http, HTML). This contact is initiated by the subscriber himself and can be performed independently of NAT. In reply, all relevant connection data is communicated to the subscriber by the relaying center. With this data, the subscriber can now subscribe to the transmission tree.

If the subscriber is integrated in the tree, data can be transmitted to the subscriber at any time in the context of the existing connections. If an existing connection is interrupted, the subscriber immediately approaches the relaying center again and receives, as for the first contact, transmission of new connection data.

Figure 7A:
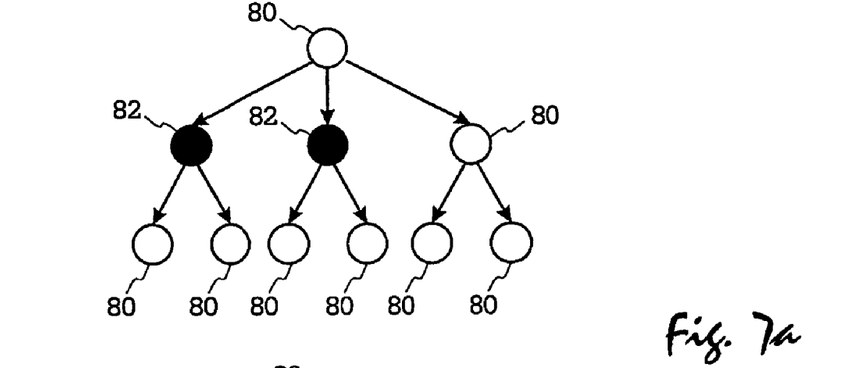
FIG. 7 shows, in a) and b), advantageous arrangements of NAT subscribers and non-NAT subscribers in a transmission tree set up with an embodiment of the method according to the present invention.

In setting up the tree, care is taken that the subordinate nodes of a NAT subscriber 82 are all non-NAT subscribers 80 since, for a point-to-point connection, it must be possible to contact at least one of the two end points (FIG. 7a).

Figure 7B:
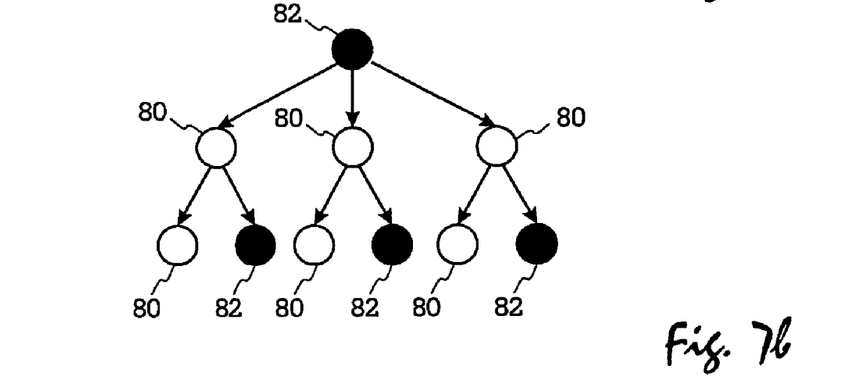

Moreover, it is advisable that, among the subordinate nodes of a non-NAT node 80, there always be at least one non-NAT subscriber 80 who, if the superordinate node 80 becomes unavailable, can take on its role. Otherwise, a major rearrangement of the transmission tree which accordingly will require more time will be necessary (FIG. 7b).

Figure 8:
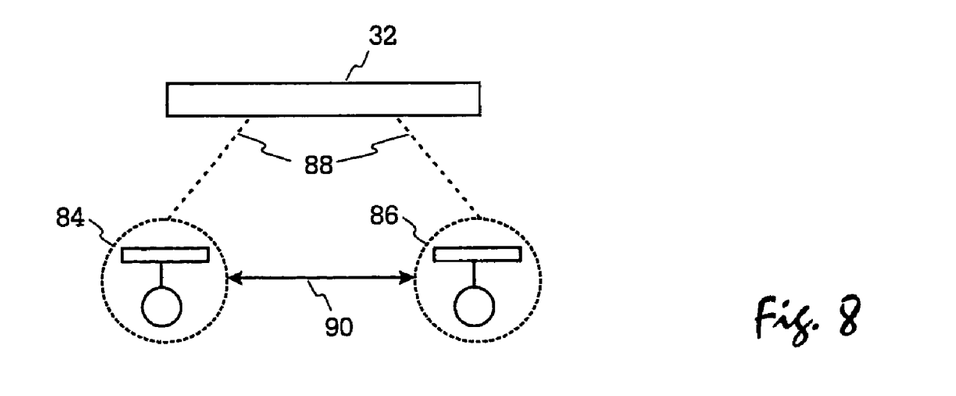
FIG. 8 shows a schematic diagram to illustrate a UDP connection setup of two NAT subscribers.

Furthermore, it is possible to create a UDP connection, even between two subscribers 84, 86, with standard NAT routers. A standard NAT router connects an external data network (WAN, Wide Area Network), for example the Internet, with an internal data network (LAN, Local Area Network). Subscribers in the internal network do not set up a direct connection to external subscribers, but rather the NAT router translates these connections between LAN and WAN.

Here, only the IP number of the NAT router is known to a WAN subscriber, not, however, the IP numbers of the LAN subscribers. A UDP/IP connection of two subscribers 84, 86, who, in differing networks, are each connected through a NAT router, can now be realized as follows:

As illustrated in FIG. 8, first, both subscribers 84, 86 set up a UDP connection 88 to the relaying center 32. Here, in the NAT routers, a look-up table is generated that in each case translates the connection between the LAN side and the WAN side. This is done by using port numbers: each connection receives, on the WAN side, a new port number on the basis of which the UDP packets can be assigned.

The relaying center 32 now analyzes the UDP packets received from both subscribers and identifies the relevant information in the UDP and IP header data, such as the source address and destination address and the source port and destination port. This information is now transmitted back to both subscribers. With this information, both subscribers produce special UDP packets 90 by using especially the port numbers that were used for the connection setup between the respective other subscriber and the relaying center.

These UDP packets 90 are now forwarded from the NAT routers to the relevant LAN subscribers, and both subscribers 84, 86 can exchange data over this connection from now on.

Likewise, a TCP/IP connection can be established between the NAT subscribers, albeit with greater effort.

Compensating for the Time Offset by Buffering the Data

A time delay accrues at every node when the data packets are forwarded. The result of this is that, from node to node, a small time offset accrues that can add up to, for example, 10 seconds across the entire tree with, for example, 10 levels.

To avoid gaps arising in the transmission due to differing time offsets when a change occurs, the data stream is buffered for a short time at every node. Here, the buffer size is chosen such that the buffered data is sufficient to compensate for the maximum potential time offset in the entire tree.

A node can now transmit to the subordinate nodes current data (with little time offset) or saved data from the buffer with the time delay that corresponds to the time offset of the subordinate node. In particular, a transmitter can supply various subordinate nodes with differing time offsets.

Now, if a subscriber changes his connection, that is, if he receives the data from another node than before, the time offset can be compensated for in that he receives the data from the buffer.

A buffer can be realized for instance in that the data stream is broken down into numbered packets. Upon connection start, the time offset is calculated from the difference between the current packets.

If the entire maximum time offset in the tree or an upper gate thereof is known, the data, when displayed, can be delayed for every subscriber individually such that it is displayed simultaneously to all subscribers.

The invention claimed is:

1. A method for transmission of a data stream, especially a reducible data stream, from a producer to a plurality of viewers, wherein producer and viewers are subscribers in a point-to-point network having point-to-point connections, in which;

the producer transmits the data stream over a first point-to-point network connection to at least one viewer;

the at least one viewer receives the data stream over the first point-to-point network connection and promptly transmits it in identical or reduced form to at least one additional viewer;

every viewer is promptly supplied with the data stream in identical or reduced form by either the producer or another viewer over the first or a second point-to-point network connection; and a new viewer, to become a transmission subscriber, sends a subscription request to a relaying entity over a third point-to-point network connection, characterized in that the relaying entity accepts subscription requests both from new viewers whose network identifier is hidden by an access computer (NAT viewers) and from new viewers whose network identifier is not hidden (non-NAT viewers), and integrates each new viewer into the data stream transmission as a new subscriber by relaying a transmission subscriber who is capable of promptly transmitting the data stream to the new viewer, in that the relaying entity sends either to the new viewer or to the relayed transmission subscriber, directly or over the point-to-point network, a request to set up a point-to-point connection with the relayed transmission subscriber or the new viewer, over which the relayed transmission subscriber promptly transmits the data stream in identical or reduced form to the new viewer; wherein any NAT transmission subscriber whose network identifier is hidden by an access computer (NAT subscriber) is relayed to only those new viewers whose network identifier is not hidden (non-NAT subscribers).

2. The transmission method according to claim 1, in which the relaying entity integrates the new viewer, upon sending the subscription request, as a new transmission subscriber, in that the relaying entity determines whether the subscription request was sent from a NAT viewer or a non-NAT viewer;

in the event that the subscription request was sent from a non-NAT viewer, the relaying entity relays to the new viewer any transmission subscriber who is capable of promptly transmitting the data stream to the new viewer, and sends a request to the relayed transmission subscriber directly or over the point-to-point network, or to the new viewer, or to both, to set up the point-to-point connection to the new non-NAT viewer or the relayed transmission subscriber, over which the relayed transmission subscriber promptly transmits the data stream in identical or reduced form to the new viewer; and in the event that the subscription request was sent from a NAT viewer, the relaying entity relays to the new viewer a NAT transmission subscriber who is capable of promptly transmitting the data stream to the new viewer, if said subscriber can set up a link to the new NAT viewer, and sends to the relayed NAT transmission subscriber, directly or over the point-to-point network, or to the new viewer, or to both, a request to set up the point-to-point connection to the new NAT viewer or the relayed transmission subscriber, over which the relayed transmission subscriber promptly transmits the data stream in identical or reduced form to the new viewer;

or relays to the new viewer a non-NAT transmission subscriber who is capable of promptly transmitting the data stream to the new viewer, and sends to the new NAT viewer over the point-to-point network connection a request to set up the point-to-point connection to the non-NAT transmission subscriber, over which said relayed transmission subscriber promptly transmits the data stream in identical or reduced form to the new NAT viewer.

3. The transmission method according to claim 1, in which the producer is a NAT subscriber whose network identifier is hidden by an access computer.

4. The transmission method according to claim 1, in which, when a viewer who supplies an additional viewer with the data stream becomes unavailable, another transmission subscriber takes the place of the unavailable viewer to supply the additional viewer, in that a further point-to-point network connection is set up between the additional viewer and the another transmission subscriber, over which said another transmission subscriber promptly transmits the data stream in identical or reduced form to the additional viewer.

5. The transmission method according to claim 4, in which the relaying entity relays to the additional viewer, after sending an appropriate notification, the another transmission subscriber who is capable of promptly transmitting the data stream in identical or reduced form to the additional viewer.

6. The transmission method according to claim 4, in which, to every viewer who becomes a transmission subscriber, a transmission subscriber is relayed who promptly supplies the viewer with the data stream, and at least one additional transmission subscriber is made known who is anticipated to be capable of promptly transmitting the data stream to the viewer if the supplying subscriber becomes unavailable.

7. The transmission method according to claim 4, in which the additional viewer was supplied with the data stream by the unavailable viewer with a time offset $\Delta t$, and the another transmission subscriber supplies the additional viewer with the data stream from his buffered data with the same time offset $\Delta t$.

8. The transmission method according to claim 1, in which the relaying entity relays to the new viewer a relayed transmission subscriber who is capable of promptly transmitting the data stream to the new viewer, in that a) the relaying entity names to the new viewer, over the point-to-point network connection, at least one transmission subscriber;

b) it is checked whether the at least one named transmission subscriber is capable of promptly transmitting the data stream to the new viewer;

c) in the event that none of the named subscribers themselves are capable of promptly transmitting the data stream to the new viewer, one of the named subscribers names to the new viewer at least one additional transmission subscriber; and d) steps b) and c) are repeated until a transmission subscriber is found who is capable of promptly transmitting the data stream to the new viewer.

9. The transmission method according to claim 1, in which any NAT subscriber is relayed to one of the non-NAT subscribers only if at least one additional non-NAT subscriber is already relayed to said one of the non-NAT subscribers.

10. The transmission method according to claim 1, in which the producer registers the transmission of the data stream with the relaying entity before beginning; and the relaying entity announces the transmission to potential viewers, so that any of said viewers can send said subscription request to the relaying entity over said third point-to-point network connection.

11. The transmission method according to claim 10, in which the viewers report ratings of a program or of the producer to the relaying entity, and the relaying entity includes this rating in the announcement of additional broadcasts of the producer.

12. The transmission method according to claim 1, in which every transmission subscriber briefly buffers the data stream received.

13. The transmission method according to claim 12, in which the time offset that occurs with every transmission subscriber when transmitting the data stream over the transmission tree, due to buffering and delayed presentation, is compensated for such that every transmission subscriber can display the data stream at the same time.

14. The transmission method according to claim 1, in which the transmission subscribers transmit to the relaying entity, over the point-to-point connections with said relaying entity, connection data containing details selected from the group of: arrangement of the transmission subscribers in the transmission tree; current transmission rates; the number of hops between the transmission subscribers; time delay for the transmission; and packet loss rate on the transmission path.

15. The transmission method according to claim 14, in which the relaying entity optimizes the structure of the transmission tree on the basis of the transmitted connection data for optimum possible reception quality for the transmission subscribers, and sends appropriate connection start, connection interrupt or connection modification requests to the transmission subscribers.

16. The transmission method according to claim 1, in which the viewers may transmit feedback to the producer or the relaying entity over the point-to-point connections.

17. The transmission method according to claim 1, in which the producer, beginning at a certain point in time, no longer transmits the data stream or portions of the data stream, and another transmission subscriber takes the place of the producer to transmit the data stream or portions of the data stream, in that the another transmission subscriber transmits the data over a further point-to-point connection to the previous producer, who forwards it over the existing transmission connections to the other transmission subscribers; or in that the another transmission subscriber forwards the data over the existing transmission connections to an additional transmission subscriber having sufficient transmission capacity, who transmits the data stream or the portions of the data stream to the producer over a further point-to-point connection.

* * * * *